United States Patent
Kamijo et al.

(10) Patent No.: US 8,542,998 B2
(45) Date of Patent: Sep. 24, 2013

(54) PASSIVE OPTICAL NETWORK SYSTEM AND SLEEP TIME DETERMINATION METHOD

(75) Inventors: Makoto Kamijo, Yokohama (JP); Noboru Oosawa, Yokohama (JP); Satoshi Konno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 156 days.

(21) Appl. No.: 13/274,603

(22) Filed: Oct. 17, 2011

(65) Prior Publication Data
US 2012/0114331 A1   May 10, 2012

(30) Foreign Application Priority Data
Nov. 4, 2010   (JP) ................................. 2010-247406

(51) Int. Cl.
*H04J 14/00*   (2006.01)

(52) U.S. Cl.
USPC ............... 398/72; 398/66; 398/67; 398/58; 398/100; 398/33; 398/38; 370/352; 370/392; 370/468; 370/465

(58) Field of Classification Search
USPC ............ 398/66, 67, 68, 69, 70, 71, 72, 98, 398/99, 100, 58, 75, 79, 33, 38, 34, 35; 370/352, 392, 468, 389, 465, 395.31
See application file for complete search history.

(56) References Cited

U.S. PATENT DOCUMENTS

| 8,000,602 | B2* | 8/2011 | Haran et al. | 398/72 |
| 8,346,082 | B2* | 1/2013 | Yoon et al. | 398/72 |
| 2009/0263127 | A1 | 10/2009 | Haran et al. | |

FOREIGN PATENT DOCUMENTS

| JP | 2008-113193 A | 5/2008 |
| JP | 2009-260970 A | 11/2009 |

\* cited by examiner

*Primary Examiner* — Hanh Phan
(74) *Attorney, Agent, or Firm* — Mattingly & Malur, PC

(57) ABSTRACT

The longest possible sleep time is selected while data missing is prevented in a PON system by referring to the link speeds and the queue buffer capacities of an OLT and ONUs. The OLT calculates a first sleep time candidate based on a first link speed at which the OLT communicates with an upper network and the capacity of an unused area of a first queue buffer where downstream data is held for each of the destination ONUs. Each of the ONUs calculates a second sleep time candidate based on a second link speed at which each of the ONUs communicates with a communication terminal and the capacity of an unused area of a second queue buffer where upstream data bound for the OLT is held. The smaller sleep time is determined and used to change one of the ONUs to a sleep mode.

18 Claims, 14 Drawing Sheets

| ONU NUMBER | ONU MODE |
|---|---|
| A | NORMAL OPERATION |
| B | SLEEP |
| C | NORMAL OPERATION |
| ⋮ | ⋮ |

FIG.5

| ONU NUMBER | RETURN-FROM-SLEEP TIME |
|---|---|
| A | NOT SPECIFIED |
| B | 10s |
| C | NOT SPECIFIED |
| ⋮ | ⋮ |

FIG.6

| BUFFER CAPACITY / LINK SPEED | 1G bit | 100M bit | 10M bit |
|---|---|---|---|
| 1Gbit/s | 1s | 0.1s | 0.01s |
| 100Mbit/s | 10s | 1s | 0.1s |
| 10Mbit/s | 100s | 10s | 1s |

FIG.14

PASSIVE OPTICAL NETWORK SYSTEM AND SLEEP TIME DETERMINATION METHOD

CLAIM OF PRIORITY

The present application claims priority from Japanese patent application JP 2010-247406 filed on Nov. 4, 2010, the content of which is hereby incorporated by reference into this application.

BACKGROUND OF THE INVENTION

1. Field of the Invention

The present invention relates to passive optical network systems and sleep time determination methods, and more specifically, to a passive optical network system in which a sleep operation is performed while taking into account the link speed and the queue buffer capacity of each of an optical line terminal and an optical network unit, and a sleep time determination method used in the passive optical network system.

2. Description of the Related Art

While the speed and bandwidth of communication networks have been advancing, optical networks have been introduced in order to handle the increased speed and bandwidth. In the optical networks, one optical line terminal (hereafter called OLT) and one optical network unit (hereafter called ONU) perform point-to-point communications through an optical fiber. A passive optical network (hereafter called PON) is a star point-to-multipoint network formed of one OLT and a plurality of ONUs connected with optical fibers and an optical splitter, which branches optical fibers. Typical PONs include an Ethernet (registered trademark) PON (EPON) standardized in IEEE 802.3 and a gigabit capable PON (GPON) standardized in ITU-T G.984. In a PON, upstream frames sent from ONUs to the OLT and downstream frames sent from the OLT to the ONUs are multiplexed by wavelength division multiplexing (hereafter called WDM). In the downstream communication, the OLT sends identical data to all the ONUs connected through optical fibers. When each ONU receives the data, the ONU refers to destination information included in the preamble to discard frames other than those sent to the ONU and transfers only the frames sent to the ONU to the user. In the upstream communication, frames are multiplexed by time division multiplexing (hereafter called TDM), in which each ONU sends data at the specified time according to the transfer permission sent from the OLT. PON systems have been introduced, including those handling signals at a low speed such as 64 kbps, broadband PON (BPON) systems that send and receive fixed-length ATM cells at about 600 Mbps at a maximum, EPON systems that send and receive variable-length Ethernet packets at about 1 Gbps at a maximum, and GPON systems that can handle signals at a faster speed of about 2.4 Gbps. A high-speed PON that can handle signals at a rate ranging from 10 Gbps to 40 Gbps will be demanded in the future.

As the communication speeds of such PONs have increased, the power consumption of relay apparatuses disposed on transfer lines tends to increase. Since ONUs are installed in subscriber premises, a number of ONUs are disposed in the network. The ONUs require an available bandwidth for shorter periods than the OLT and an upper switch group. Therefore, the ONUs are left unused when they do not perform communication while using power.

Japanese Unexamined Patent Application Publication No. 2008-113193 discloses a method of reducing power consumption by setting the functional blocks of each ONU to a low power consumption mode when terminal equipment (hereafter called TE) is physically not connected to the ONU through a LAN cable, for example. Japanese Unexamined Patent Application Publication No. 2009-260970 discloses a method of setting an ONU to a sleep mode through a procedure in which the ONU sends a sleep request to the OLT and the OLT permits the request, for example.

SUMMARY OF THE INVENTION

As described above, higher speed and larger capacity communications have been used and the power consumption of relay apparatuses disposed on transfer lines tends to increase. Therefore, power saving has been demanded.

In Japanese Unexamined Patent Application Publication No. 2008-113193, transition to the low power consumption mode depends only on whether the TE is physically connected to the ONU through a LAN cable. After the TE is connected to the ONU, transition to the low power consumption mode is not made. Even when communications are not performed, the power consumption cannot be reduced.

In Japanese Unexamined Patent Application Publication No. 2009-260970, a procedure is added in which, if the ONU does not perform communications, when the ONU receives a sleep permission from the OLT, the ONU changes its state to the sleep mode. Since the period in which the ONU sleeps is fixed to a specified sleep time, however, even when the ONU can sleep longer than the specified sleep time, the ONU needs to select the specified sleep time, which is shorter than the period in which the ONU can sleep. The ONU repeats transition to and return from the sleep mode, which does not produce an efficient power saving effect. If the specified sleep time is too long, packets received during the sleep mode cannot be stored in a buffer and may overflow, causing data missing.

Accordingly, an object of the present invention is to provide a passive optical network system and a sleep time determination method in which a sleep time is determined based on the queue buffer capacity and user-network interface (hereafter called UNI) link speed of each ONU and the queue buffer capacity and server-network interface (hereafter called SNI) link speed of an OLT, and transition to and return from a sleep mode is made. Another object of the present invention is to implement a passive optical network system capable of reducing power consumption by selecting a sleep time as long as possible while preventing data missing.

A reduction in the power consumption of each ONU made by selecting the sleep time as long as possible while preventing data missing and by making transition to and return from the sleep mode, described above, can be implemented when the ONU has a sleep time management section for managing the longest sleep time based on its UNI link speed and queue buffer capacity, the OLT has a sleep time management section for managing the longest sleep time based on its SNI link speed and queue buffer capacity, and the longest sleep times are compared and one of them is selected.

One example using the above-described means will be described. When a non-communication state of an ONU has lasted for a predetermined period of time, the ONU refers to the sleep time management section by using its link speed and queue buffer capacity (capacity of an unused area), and sends the corresponding longest sleep time to the OLT. When the OLT receives the longest sleep time, the OLT refers to the sleep time management section by using its link speed and queue buffer capacity (capacity of an unused area), compares the corresponding longest sleep time with the longest sleep time received from the ONU, and determines the final longest sleep time of the ONU so as not to miss data. The OLT sends the determined longest sleep time and a sleep permission signal to the ONU, and at the same time, recognizes that the ONU is in the sleep mode. When the ONU receives the sleep permission signal, the ONU immediately changes its mode to the sleep mode. After the sleep time is finished, the ONU returns to a normal operation mode. After the ONU returns to the normal operation mode, when the ONU receives a transmission permission signal from the OLT, the ONU immediately restarts sending a frame.

Since the ONU and the OLT each have a queue buffer for storing data temporarily, when upstream data or downstream data is received while the ONU is in the sleep mode, the data is stored in the queue buffer, and a reduction in power consumption is realized while preventing data missing.

One of the foregoing objects is achieved in one aspect of the present invention through the provision of a PON system that includes at least one OLT and ONU. The OLT includes an electrical-signal transmission and receiving section for performing communications with a relay apparatus in an upper network by using an electrical signal; an electro-optical converter for performing communications with the ONU by using an optical signal; a media access controller for controlling data communication while the ONU is in a normal operation mode and a sleep mode; a queue buffer for each destination ONU; a sleep control signal processor for generating and analyzing a frame used to make the ONU perform transition to and return from the sleep mode; a sleep mode management table for managing the sleep mode of the ONU; a return-from-sleep time management table for managing the time when the ONU returns from the sleep mode; a time counter for managing the current time; a sleep time comparator for comparing the longest sleep time received from the ONU and the longest sleep time determined by the OLT; a sleep time management section for managing the longest sleep time by using an SNI link speed and a queue buffer capacity; an OLT link speed management section for managing the SNI link speed; and an OLT buffer capacity management section for managing the queue buffer capacity of the OLT. The ONU includes an electrical-signal transmission and receiving section for performing communications with a communication terminal by using an electrical signal; an electro-optical converter for performing communications with the OLT by using an optical signal; a media access controller for controlling data communication while the ONU is in the normal operation mode and the sleep mode; a queue buffer for storing traffic data; a sleep control signal processor for generating and analyzing a sleep control signal to be sent to the OLT; a sleep mode controller for controlling transition to and return from the sleep mode; a sleep mode management table for managing the sleep mode; a time counter for managing the current time; a sleep time comparator for comparing the longest sleep time received from the OLT and the longest sleep time determined by the ONU; a sleep time management section for managing the longest sleep time by using a UNI link speed and a queue buffer capacity; an ONU link speed management section for managing the UNI link speed; and an ONU buffer capacity management section for managing the queue buffer capacity of the ONU.

According to the first solving means of the present invention, there is provided a passive optical network system comprising at least one optical line terminal and a plurality of optical network units, the optical line terminal comprising:
a first interface for communications with an upper network at a first link speed;
a first queue buffer for holding downstream data for each of the destination optical network units;
an electro-optical converter for communications with the optical network units; and
a first controller for applying sleep control to the optical network units;

each of the optical network units comprising:
a second interface for communications with a communication terminal at a second link speed;
a second queue buffer for holding upstream data bound for the optical line terminal;
an electro-optical converter for communications with the optical line terminal; and
a second controller for applying sleep control to the local optical network unit;

wherein:
the first controller of the optical line terminal calculating a first sleep time candidate based on a capacity of an unused area of the first queue buffer and the first link speed;

the second controller of each of the optical network units calculating a second sleep time candidate based on a capacity of an unused area of the second queue buffer and the second link speed;

either the first controller or the second controller comparing the first sleep time candidate and the second sleep time candidate for at least one of the optical network units and determining the smaller thereof as an actual sleep time; and the at least one of the optical network units being changed to a sleep mode during the determined actual sleep time.

According to the second solving means of the present invention, there is provided a sleep time determination method of determining a sleep time of each optical network unit in a passive optical network system provided with at least one optical line terminal and a plurality of optical network units, comprising the steps of:

calculating a first sleep time candidate based on a first link speed at which the optical line terminal communicates with an upper network and a capacity of an unused area of a first queue buffer where downstream data is held for each of the destination optical network units, by the optical line terminal;

calculating a second sleep time candidate based on a second link speed at which each of the optical network units communicates with a communication terminal and a capacity of an unused area of a second queue buffer where upstream data bound for the optical line terminal is held, by each of the optical network units; and comparing the first sleep time candidate and the second sleep time candidate for at least one of the optical network units and determining the smaller thereof as an actual sleep time used to change the at least one of the optical network units to a sleep mode, by either the optical line terminal or the at least one of optical network units.

By the present invention, it is possible to provide a passive optical network system and a sleep time determination method in which a sleep time is determined based on the queue buffer capacity and UNI link speed of each ONU and the queue buffer capacity and SNI link speed of an OLT, and transition to and return from a sleep mode is made. Also, it is possible, by the present invention, to implement a passive optical network system capable of reducing power consumption by selecting a sleep time as long as possible while preventing data missing.

BRIEF DESCRIPTION OF THE DRAWINGS

FIG. 5 shows a sleep mode management table of the OLT.

FIG. 6 shows a return-from-sleep time management table of the OLT.

FIG. 14 shows an example structure of a sleep time candidate table.

DESCRIPTION OF THE PREFERRED EMBODIMENTS

Figure 1:
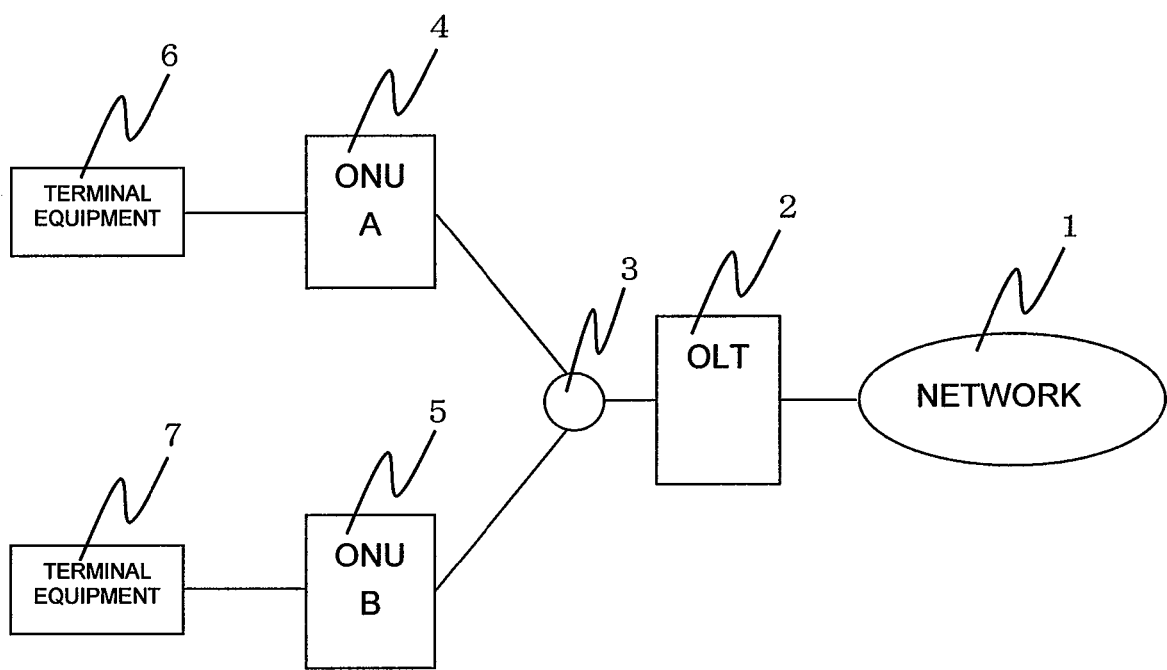
FIG. 1 shows the structure of a PON system according to the present invention and a network to which an OLT and ONUs are connected.

An embodiment of the present invention will be described below. FIG. 1 shows the structure of a PON system according to the present invention and a network to which an optical line terminal (OLT) and optical network units (ONUs) are connected.

The PON system includes at least one OLT and a plurality of ONUs.

In FIG. 1, an upper network 1, an OLT 2, an optical splitter 3, ONUs 4 and 5, a TE 6 connected to the ONU A, and a TE 7 connected to the ONU 5 are shown. FIG. 1 shows only two ONUs, the ONU A 4 and the ONU B 5, and only two pieces of TE, the TE 6 and the TE 7, but it is assumed that a plurality of ONUs are connected to the OLT in the same way through the optical splitter 3.

In FIG. 1, the OLT and the ONUs perform communications by using optical signals multiplexed by WDM. Therefore, the upstream communications (from the ONUs to the OLT) and the downstream communications (from the OLT to the ONUs) do not collide. Since the plurality of ONUs perform communications with an identical transmission wavelength, the OLT controls the optical signal transmission time of each ONU by TDM such that each optical signal is sent at a different time.

Figure 2:
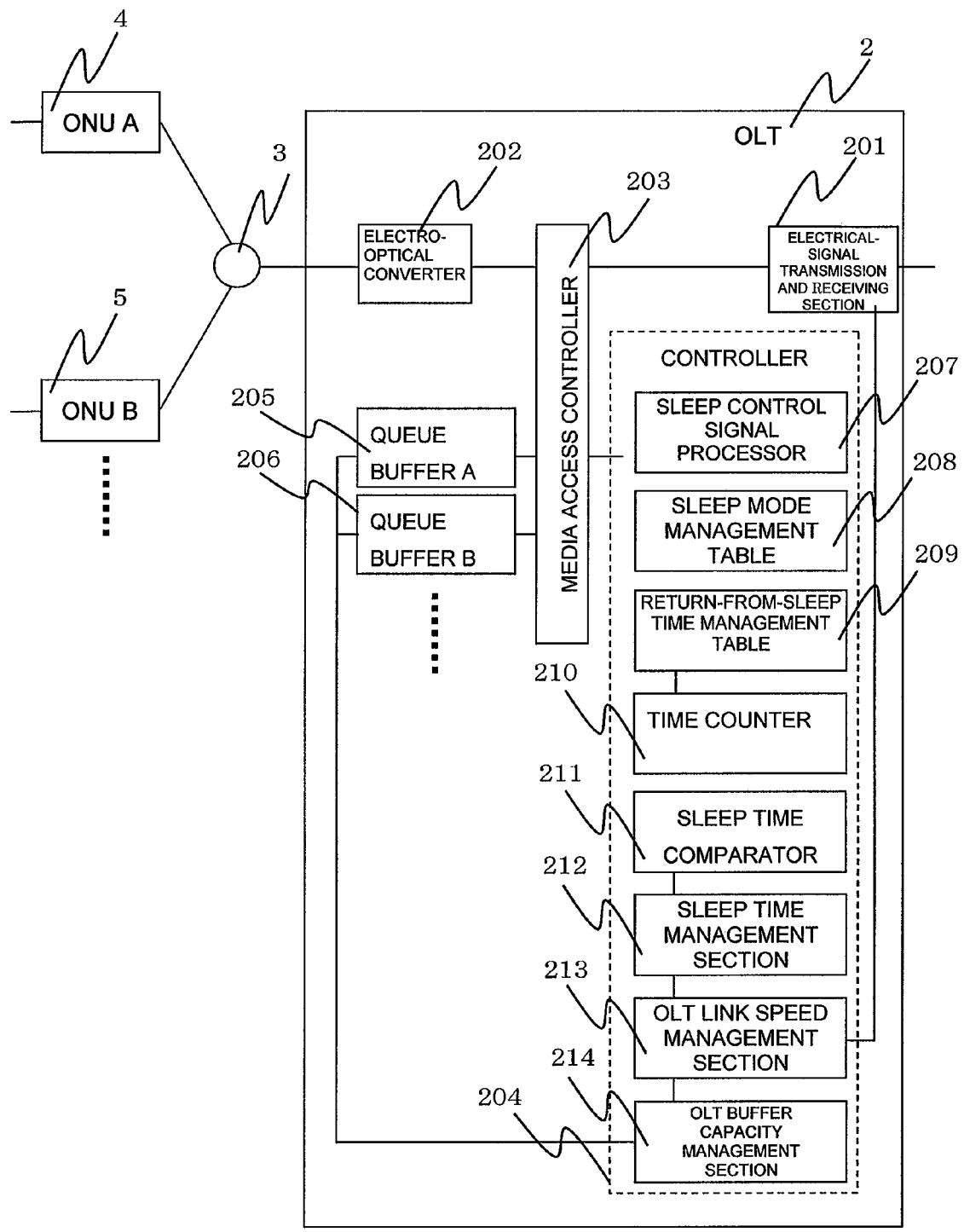
FIG. 2 is a block diagram showing an example structure of an OLT according to the present invention.

FIG. 2 is a block diagram showing an example structure of the OLT of the present embodiment.

The OLT 2 includes an electrical-signal transmission and receiving section 201 for performing communications with a relay apparatus in the upper network by using an electrical signal; an electro-optical converter 202 for performing communications with each ONU by using an optical signal; a media access controller 203 for controlling data communication while the ONU is in a normal operation mode and a sleep mode; a controller 204 for controlling each functional block in the OLT and for performing sleep control; a queue buffer A 205 for storing traffic data of a queue A; and a queue buffer B 206 for storing traffic data of a queue B. For example, the queue buffer A stores traffic data to be sent to the ONU A, and the queue buffer B stores traffic data to be sent to the ONU B. FIG. 2 shows the queue buffers A and B, but the OLT can have a queue buffer for storing downstream traffic data for each destination ONU.

The controller 204 includes a sleep control signal processor 207 for generating and analyzing a frame used to make each ONU perform transition to and return from the sleep mode; a sleep mode management table 208 for managing the sleep mode of each ONU; a return-from-sleep time management table 209 for managing the time when each ONU returns from the sleep mode; a time counter 210 for managing the current time; a sleep time comparator 211 for comparing the longest sleep time (second sleep time candidate) received from each ONU and the longest sleep time (first sleep time candidate) determined by the OLT; a sleep time management section 212 for managing the longest sleep time by using an SNI link speed (first link speed) and a queue buffer capacity; an OLT link speed management section 213 for managing the SNI link speed; and an OLT buffer capacity management section for managing the queue buffer capacity of the OLT. The SNI link speed means the link speed used between the electrical-signal transmission and receiving section 201 and the upper network 1.

When the electro-optical converter 202 receives an upstream frame, the media access controller 203 associates the MAC address of the upstream frame with transmission-source ONU information attached in the preamble as route information and stores it, and sends the upstream frame from the electrical-signal transmission and receiving section 201. When the electrical-signal transmission and receiving section 201 receives a downstream frame, the media access controller 203 refers to the MAC address of the downstream frame, attaches the destination ONU identification information determined from route information held in advance to the preamble of the downstream frame, and sends the downstream frame from the electro-optical converter 202. It is assumed that the media access controller 203 has a switching function such as that described above.

Figure 3:
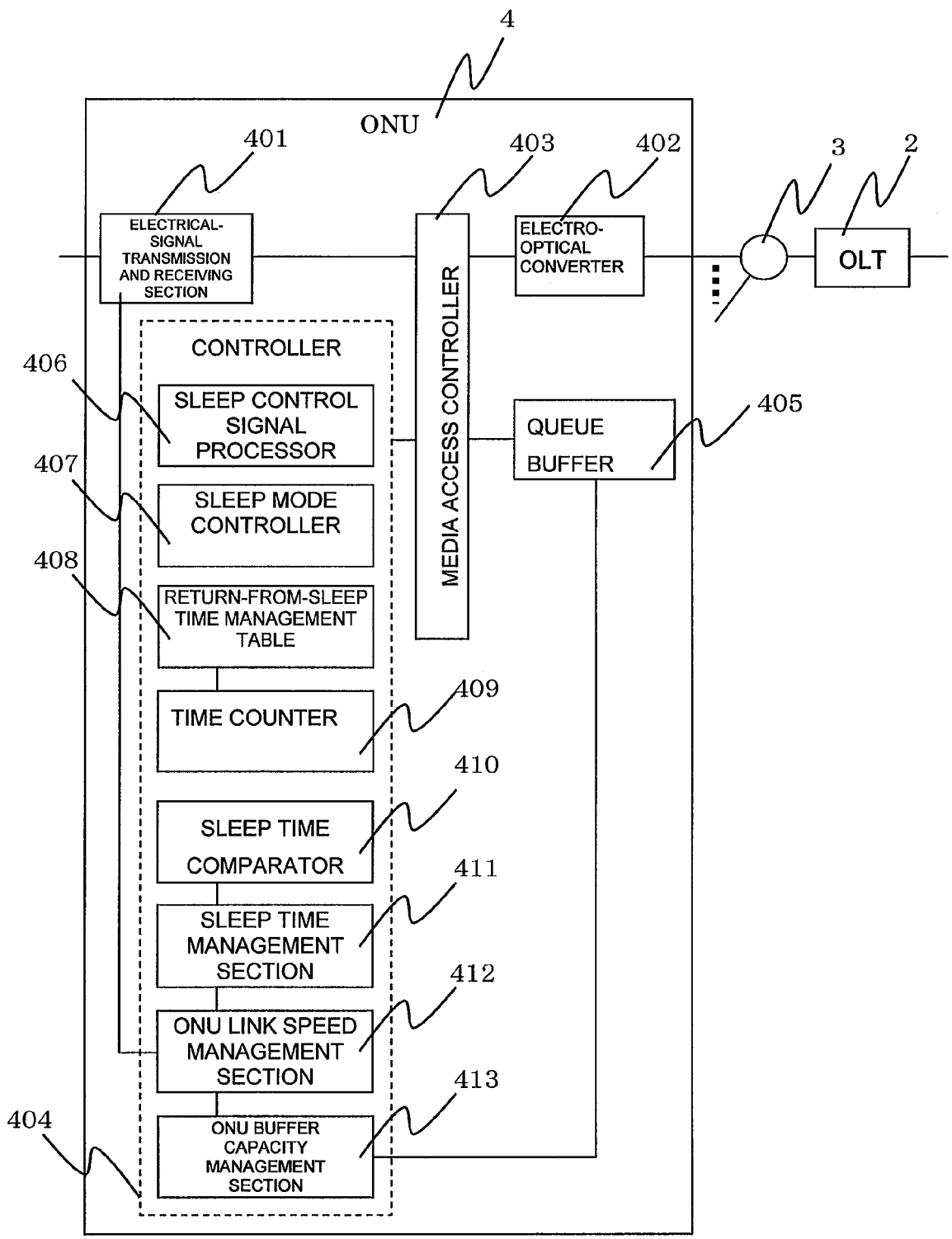
FIG. 3 is a block diagram showing an example structure of an ONU according to the present invention.

FIG. 3 is a block diagram showing an example structure of an ONU according to the present embodiment. FIG. 3 shows the structure of the ONU 4, but the ONU 5 also has the same structure.

The ONU 4 includes an electrical-signal transmission and receiving section 401 for performing communications with TE or another unit by using an electrical signal; an electro-optical converter 402 for performing communications with the OLT by using an optical signal; a media access controller 403 for controlling data communication while the ONU is in the normal operation mode and the sleep mode; a controller 404 for controlling each functional block in the ONU; and a queue buffer 405 for storing traffic data. The controller 404 includes a sleep control signal processor 406 for generating and analyzing a sleep control signal to be sent to the OLT; a sleep mode controller 407 for controlling transition to and return from the sleep mode; a return-from-sleep-time management table 408 for managing the time when each ONU returns from the sleep mode; a time counter 409 for managing the current time; a sleep time comparator 410 for comparing the longest sleep time received from the OLT and the longest sleep time determined by the ONU; a sleep time management section 411 for managing the longest sleep time by using a UNI link speed and a queue buffer capacity; an ONU link speed management section 412 for managing the UNI link speed (second link speed); and an ONU buffer capacity management section 413 for managing the queue buffer capacity of the ONU. The UNI link speed means the link speed used between the electrical-signal transmission and receiving section 401 and the terminal equipment.

The longest sleep time determined by the ONU based on the UNI link speed and the queue buffer capacity is called the longest sleep time 1, the longest sleep time determined by the OLT based on the SNI link speed and the queue buffer capacity is called the longest sleep time 2, and the final ONU sleep time selected by comparing the longest sleep time 1 and the longest sleep time 2 is called an actual sleep time.

In the present embodiment, when the ONU is in the sleep mode, power supply to the electro-optical converter 402 is stopped to stop communications with the electro-optical converter 202 of the OLT; the media access controller 403 continuously operates only the function of storing an upstream frame received by the electrical-signal transmission and receiving section 401 in the queue buffer 405 and stops the other functions; and the sleep mode controller 407 monitors the time counter 409 to determine according to the return-from-sleep time management table 408 whether the current time reaches the return-from-sleep time instructed by the sleep control signal processor 207 of the OLT, for example.

Figure 4:
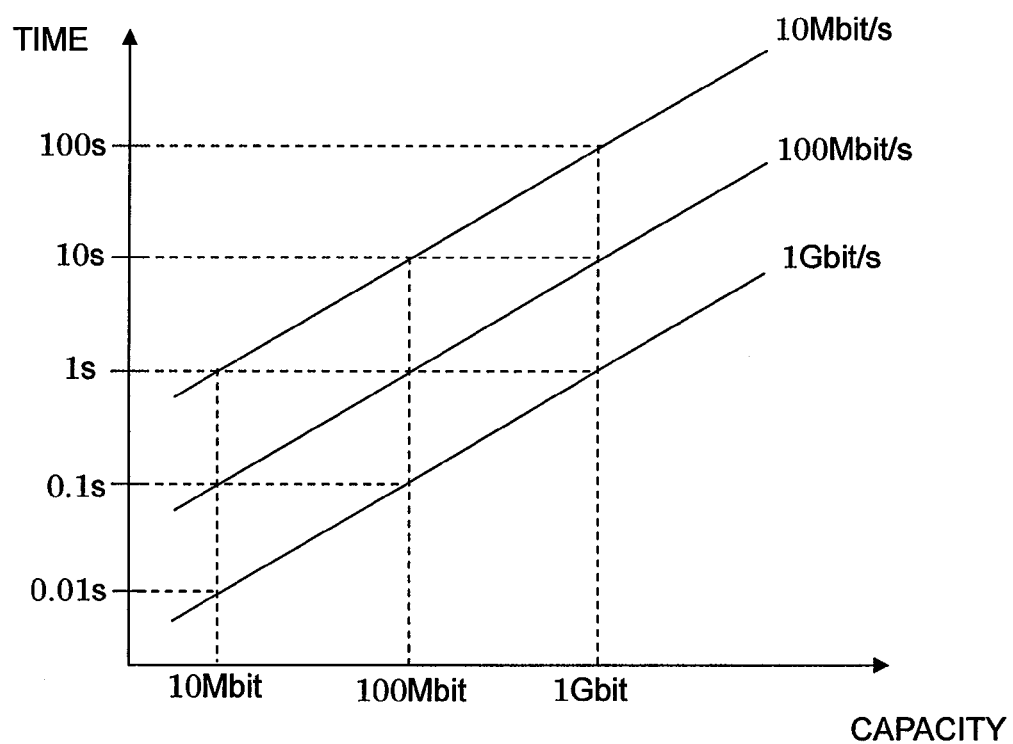
FIG. 4 shows the operation of sleep time management sections of the OLT and the ONU.

FIG. 4 shows the operation of the sleep time management sections of the OLT and the ONU.

The sleep time management section 212 of the OLT manages the longest sleep time of the OLT based on the link speed and the queue buffer capacity of the OLT, and the sleep time management section 411 of each of the ONUs 4 and 5 manages the longest sleep time of the ONU based on the link speed and the queue buffer capacity of the ONU.

A method for determining the longest sleep time will be described below.

For example, as shown in FIG. 4, the longest sleep time determined by the OLT and the longest sleep time determined by each ONU increase as the capacity of an unused part of the queue buffer of each unit increases. The longest sleep time decreases as the first link speed and the second link speed increase.

For example, the relationship (proportion in the case of FIG. 4) between the longest sleep time and the capacity of the unused part of the queue buffer may be determined in advance for each link speed, and each of the OLT and the ONUs may calculate the longest sleep time according to the relationship based on the link speed managed by the link speed management section and the capacity of the unused area of the queue buffer managed by the buffer capacity management section. The above-described relationship need to be specified for the link speeds determined in advance based on the network structure. In FIG. 4, the time in the vertical axis indicates the time value at which the corresponding capacity of the unused area of the buffer becomes full when data is received at the corresponding link speed. The time in the vertical axis may be replaced with a multiple of the time.

A memory area may be used to have a table for the longest sleep time. The values at representative points (intersections of dotted lines) in FIG. 4 may be stored in advance in a table (sleep time candidate table) in each of the OLT and the ONUs (for example, in the controllers thereof), and each of the OLT and the ONUs may refer to this table to determine the longest sleep time based on the link speed managed by the link speed management section and the capacity of the unused area of the queue buffer managed by the buffer capacity management section. FIG. 14 shows an example structure of the sleep time candidate table.

FIG. 5 shows an example of the sleep mode management table 208 of the OLT.

The sleep mode management table 208 is updated when each ONU makes transition to and return from the sleep mode. This table has the mode of each ONU connected to the OLT for each ONU number (or for each appropriate ONU identification information), that is, whether the mode is the normal operation mode or the sleep mode.

FIG. 6 shows an example of the return-from-sleep time management table 209 of the OLT.

The return-from-sleep time management table 209 is updated when each ONU makes transition to the sleep mode. This table has the time when each ONU connected to the OLT is returned from the sleep mode for each ONU number (or for each appropriate ONU identification information). The return-from-sleep time is not specified for an ONU that is in the normal operation mode.

Figure 7:
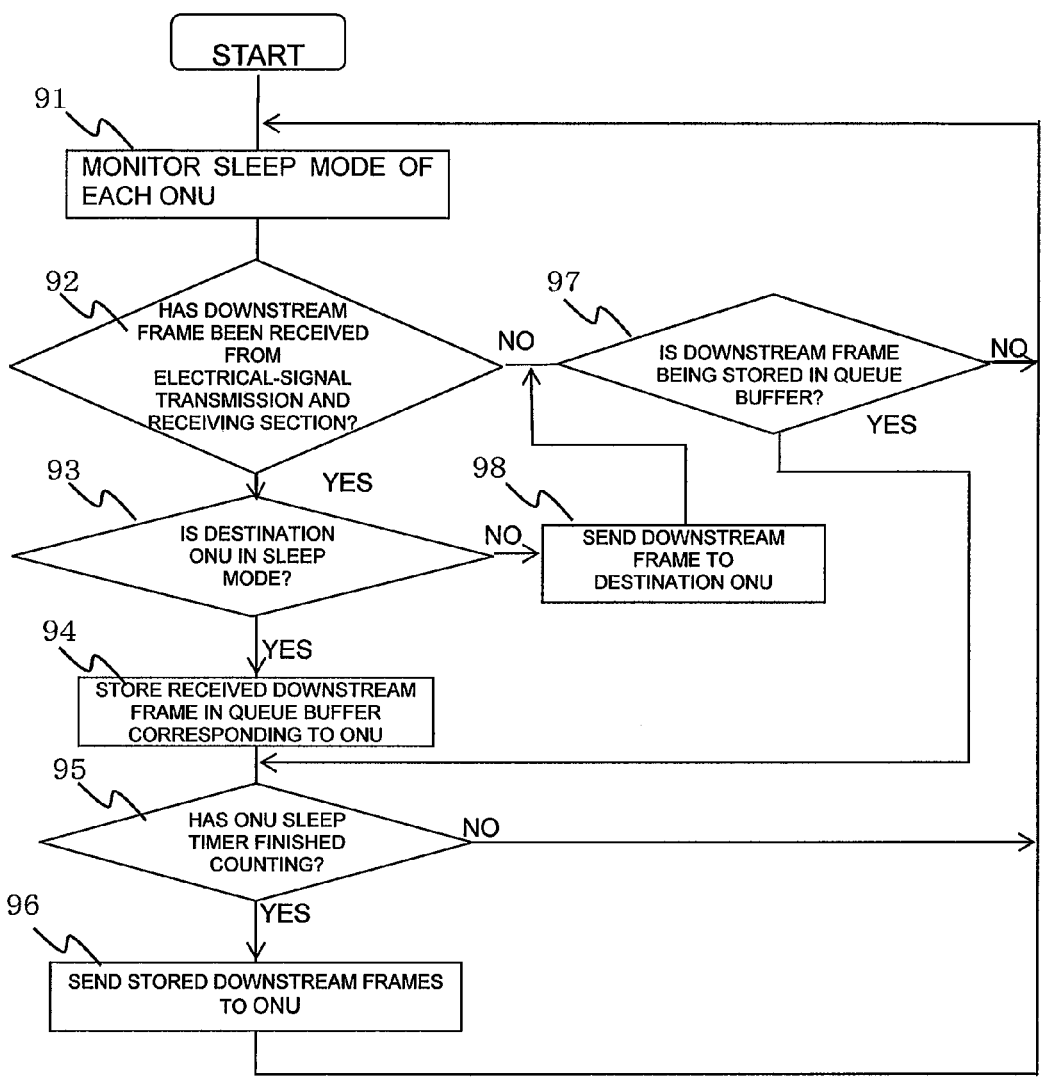
FIG. 7 is a flowchart showing how the OLT directs received downstream frames.

FIG. 7 is a flowchart showing how the OLT directs a received downstream frame. The OLT manages the operation mode of each connected ONU in the sleep mode management table 208.

When the OLT receives a downstream frame (processes 91 and 92), the controller 204 refers to the sleep mode management table 208 to check whether the downstream frame destination ONU is in the sleep mode (process 93). When the ONU is in the sleep mode, the media access controller 203 stores the downstream frame in the queue buffer corresponding to the ONU (processes 93 and 94). Until a sleep timer of the ONU finishes counting, the OLT stores all received downstream frames bound for the ONU in the queue buffer corresponding to the ONU (processes 91 to 95). The downstream frames stored in the queue buffer is sent to the ONU after the sleep timer of the ONU finishes counting and the ONU is changed to the normal operation mode (processes 95 and 96).

When the destination ONU is not in the sleep mode but in the normal operation mode, the media access controller 203 sends the downstream frame to the ONU through the electro-optical converter 202 without storing it in the queue buffer (processes 93 and 98)

Processing Case 1 for Transition to and Return from Sleep Mode

Figure 8:
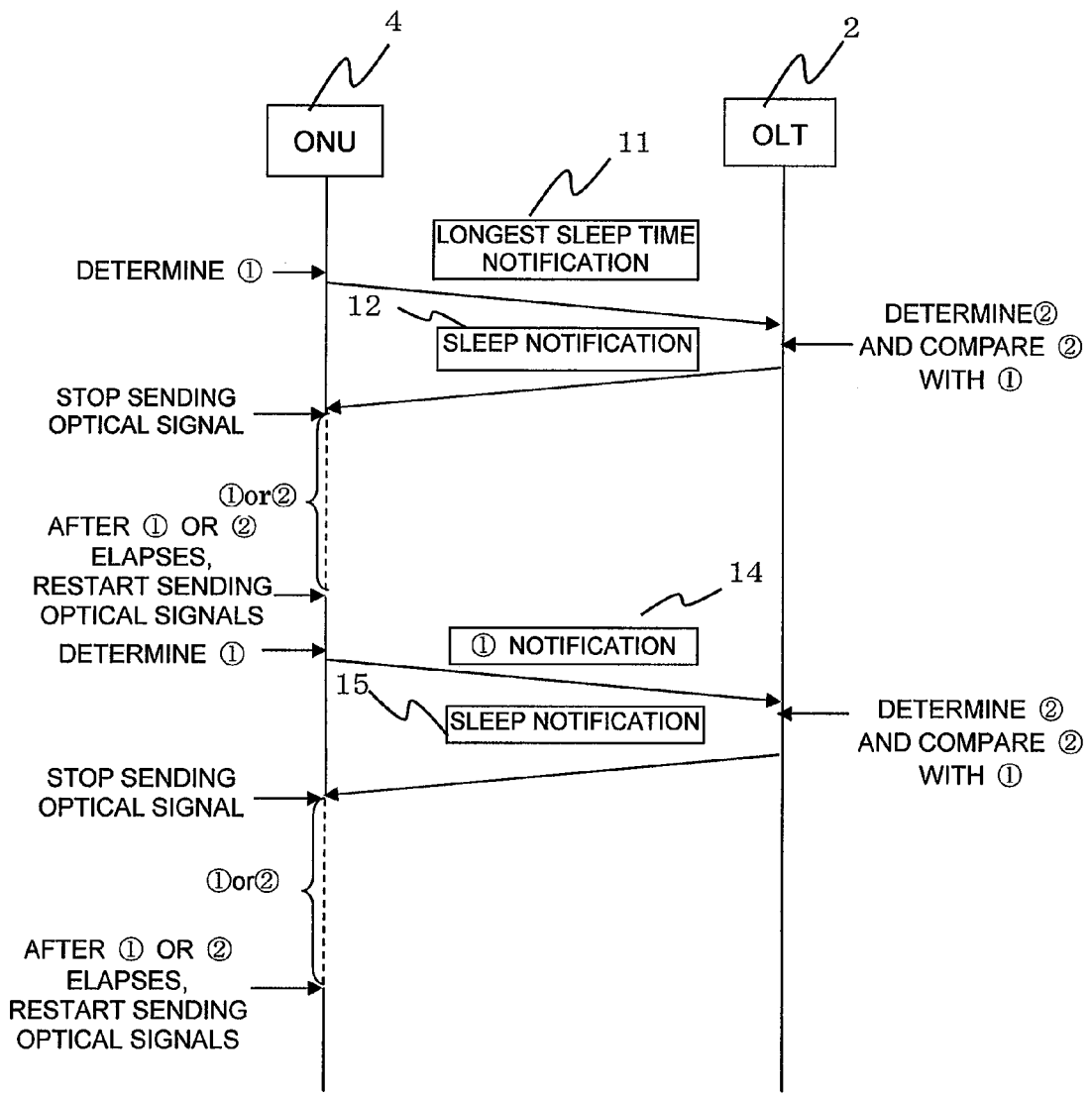
FIG. 8 is a sequence diagram showing how the ONU makes transition to and return from a sleep mode at ONU trigger 1.

FIG. 8 is a sequence diagram indicating that the ONU makes transition to and return from the sleep mode at ONU trigger 1.

Sleep control signals exchanged between the OLT and each ONU include, for example, a longest sleep time notification signal, a longest sleep time notification request signal, and a sleep notification signal. In each of the following sequences, a description will be made for the ONU 4, but the same is applied to the ONU 5.

When the ONU is in the normal operation mode, the sleep control signal processor 406 monitors the passing information of upstream and downstream frames, sent from the controller 404, and measures the time during which a frame does not pass by regularly referring to the time counter 409 or every time an upstream or downstream frame passes. When a non-communication state in which an upstream or downstream frame does not pass has lasted for a predetermined time, the sleep mode controller 407 makes the sleep control signal processor 406 generate a longest sleep time notification signal 11 through the controller 404. The longest sleep time notification signal 11 includes the ONU identification information, the longest sleep time 1 (indicated by encircled 1 in the figure) obtained from information managed by the ONU link speed management section 412 and the ONU buffer capacity management section 413, and information indicating the value of the time counter when the longest sleep time notification signal is generated. The sleep mode controller 407 sends the longest sleep time notification signal 11 from the electro-optical converter 402.

When the OLT controller 204 receives the longest sleep time notification signal 11 from the electro-optical converter 402, the OLT controller 204 makes the sleep control signal processor 207 analyze the longest sleep time notification signal 11. The controller 204 identifies the ONU A, which is the transmission source of the longest sleep time notification signal 11, and the controller 204 makes the sleep time comparator 211 compare the longest sleep time 2 (indicated by encircled 2 in the figure) obtained from information managed by the OLT link speed management section 213 and the OLT buffer capacity management section 214, with the longest sleep time 1 obtained from the longest sleep time notification signal 11. The controller 204 determines the smaller in comparison, for example, as the actual sleep time, and then, makes the sleep control signal processor 207 generate a sleep notification signal 12. At the same time, the controller 204 records in the sleep mode management table 208 that the ONU A is in the sleep mode. The controller 204 also refers to the value of the time counter 210 obtained when the sleep notification signal 12 is generated, to calculate the value of the time counter obtained at the return-from-sleep time, and records the value in the return-from-sleep time management table 209. The controller 204 further calculates the value of the time counter 409 of the ONU A obtained at the return-from-sleep time and records the value in the return-from-sleep time management table 209. The sleep notification signal 12 includes the ONU identification information of the ONU A, which makes transition to the sleep mode, and the value of the time counter obtained at the return-from-sleep time.

When the controller 404 receives the sleep notification signal 12 from the electro-optical converter 202, the controller 404 makes the sleep control signal processor 406 analyze the sleep notification signal 12. When the controller 404 identifies the permission of the OLT controller 204 for the transition of the ONU A to the sleep mode, the controller 404 records the return-from-sleep time in the sleep mode controller 407. Then, the controller 404 changes the mode to a mode in which an upstream frame received from the electrical-signal transmission and receiving section 401 is transferred to the queue buffer 405; and continues only that transfer function and a function necessary for a procedure for returning from the sleep mode and stops the other functions (changes the mode to the sleep mode). While the ONU A is in the sleep mode, upstream frames are stored in the queue buffer 405 and downstream frames are stored in the queue buffer A 205.

The sleep mode controller 407 also monitors the value of the time counter 409 until the time counter 409 reaches the return-from-sleep time described above. When the time counter 409 reaches the return-from-sleep time, the sleep mode controller 407 changes the controller 404 to the normal operation mode. In the normal operation mode, the controller 404 restarts supplying power to the electro-optical converter 402, establishing communications with the electro-optical converter 202 of the OLT. When communications are established between the electro-optical converter 202 of the OLT and the electro-optical converter 402 of the ONU, the ONU controller 404 refers to the queue buffer 405 to check whether an upstream frame received during the sleep mode exists. When an upstream frame does not exist, the controller 404 generates a longest sleep time notification signal 14 and sends it to the OLT electro-optical converter 202, in the same procedure as that described above. When the controller 204 receives the longest sleep time notification signal 14 from the electro-optical converter 202, the controller 204 checks whether a downstream frame exists. When a state in which a downstream frame does not exist continues, the controller 204 sends a sleep notification signal 15 to change the ONU A to the sleep mode in the same procedure as that described above. As long as an upstream frame to be sent to the electrical-signal transmission and receiving section 401 of the ONU A does not exist and a downstream frame to be sent to the electrical-signal transmission and receiving section 201 of the OLT does not exist, the above procedures are repeated and the ONU A is intermittently in the sleep mode.

Figure 9:
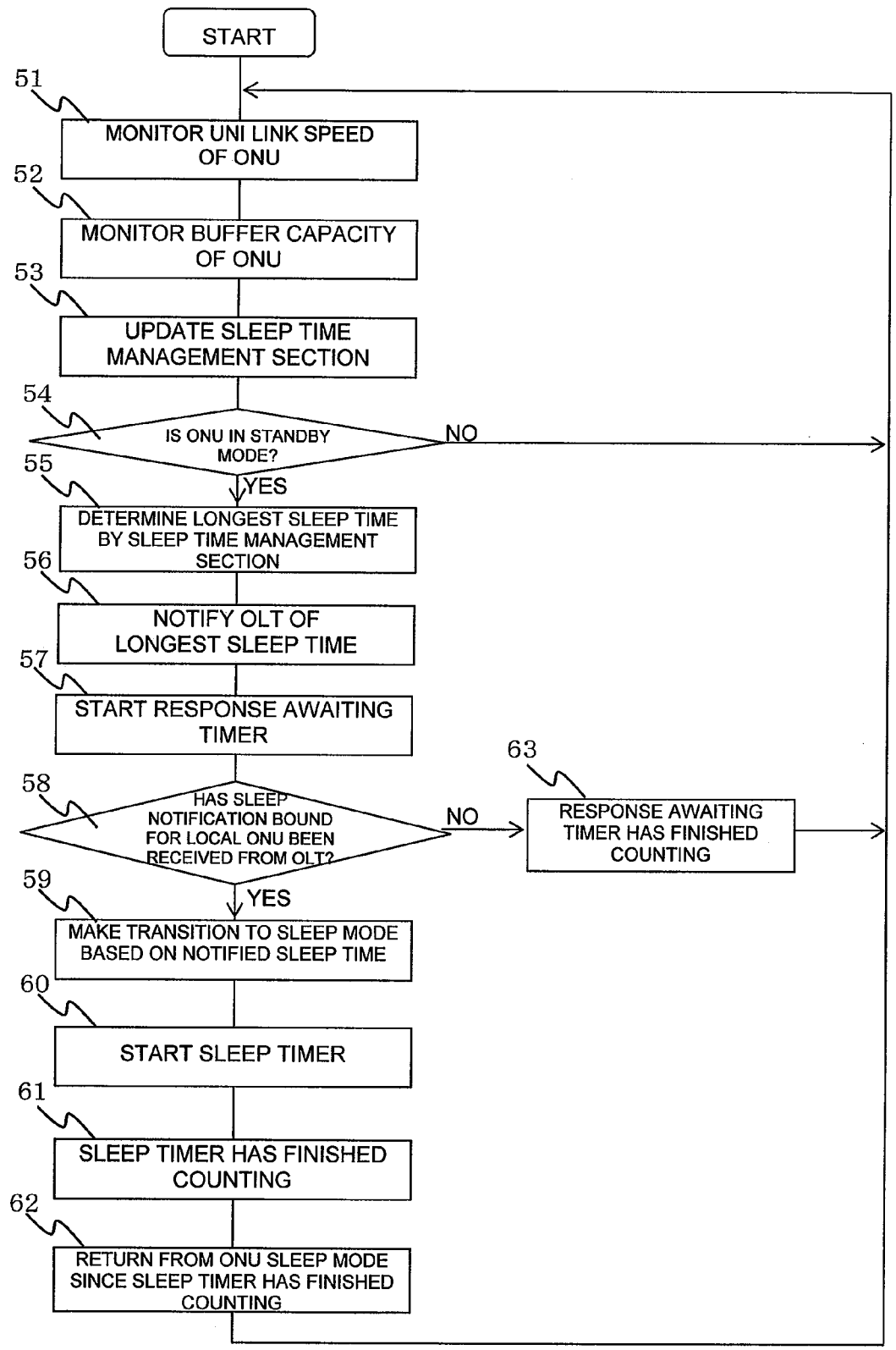
FIG. 9 is a flowchart of ONU operation performed when the ONU makes transition to and return from the sleep mode at ONU trigger 1.

FIG. 9 is an outlined flowchart of ONU operation performed when the ONU makes transition to and return from the sleep mode in the above-described processing case 1.

After the processing of the present embodiment starts, the ONU A regularly monitors its link speed and the capacity of its queue buffer by the ONU link speed management section 412 and the ONU buffer capacity management section 413 (Processes 51 and 52). By monitoring these values, the ONU A updates the sleep time management section 411, which will be described later (process 53).

When the sleep mode controller 407 of the ONU A determines that the ONU A has a non-communication state for a predetermined period of time (process 54), the sleep mode controller 407 refers to the sleep time management section through the controller 404 and determines the longest sleep time 1, as described above (process 55). Then, the controller 404 makes the sleep control signal processor 406 generate the longest sleep time notification signal 11 and makes the electro-optical converter 402 send the longest sleep time notification signal 11 (process 56).

The sleep mode controller 407 refers to the value of the time counter 409 and starts counting in order to receive the sleep notification signal 12 from the OLT (process 57). If the time counter 409 of the ONU finishes counting before the sleep notification signal 12 is received from the OLT, the ONU A determines that transition to the sleep mode was rejected and returns to the normal operation mode (processes 58 and 63). Back into the normal operation mode, the sleep mode controller 407 again starts counting the time during which the ONU A is in a non-communication state (process 51). The above-described procedure is intermittently performed until the sleep notification signal 12 is received from the OLT.

When the electro-optical converter 402 receives the sleep notification signal 12 from the OLT (process 58), the electro-optical converter 402 sends the sleep notification signal 12 to the media access controller 403. The media access controller 403 determines whether the received sleep notification signal 12 is bound for the ONU A. When he media access controller 403 determines that the ONU A has received from the OLT the sleep notification signal 12 bound for the ONU A, the controller 404 makes the sleep control signal processor 406 analyze the received sleep notification signal 12. When the ONU controller 404 identifies the permission of the OLT controller 204 for the transition of the ONU A to the sleep mode, the controller 404 stops supplying power to the electro-optical converter 402 and makes transition to the sleep mode (process 59).

Then, while the ONU A is in the sleep mode, upstream frames are stored in the queue buffer 405. The sleep mode controller 407 monitors the value of the time counter 409 until the time counter 409 reaches the return-from-sleep time described above (processes 60 and 61). When the time counter 409 reaches the return-from-sleep time, the sleep mode controller 407 changes the controller 404 to the normal operation mode (process 62). Back into the normal operation mode, the controller 404 starts supplying power to the electro-optical converter 402, establishing communications with the electro-optical converter 202 of the OLT.

After the communications are established, the ONU A refers to the queue buffer 405 to check whether an upstream frame was received during the sleep mode. If an upstream frame does not exist, a request for transition to the sleep mode is made in the same procedure as that described above.

Figure 10:
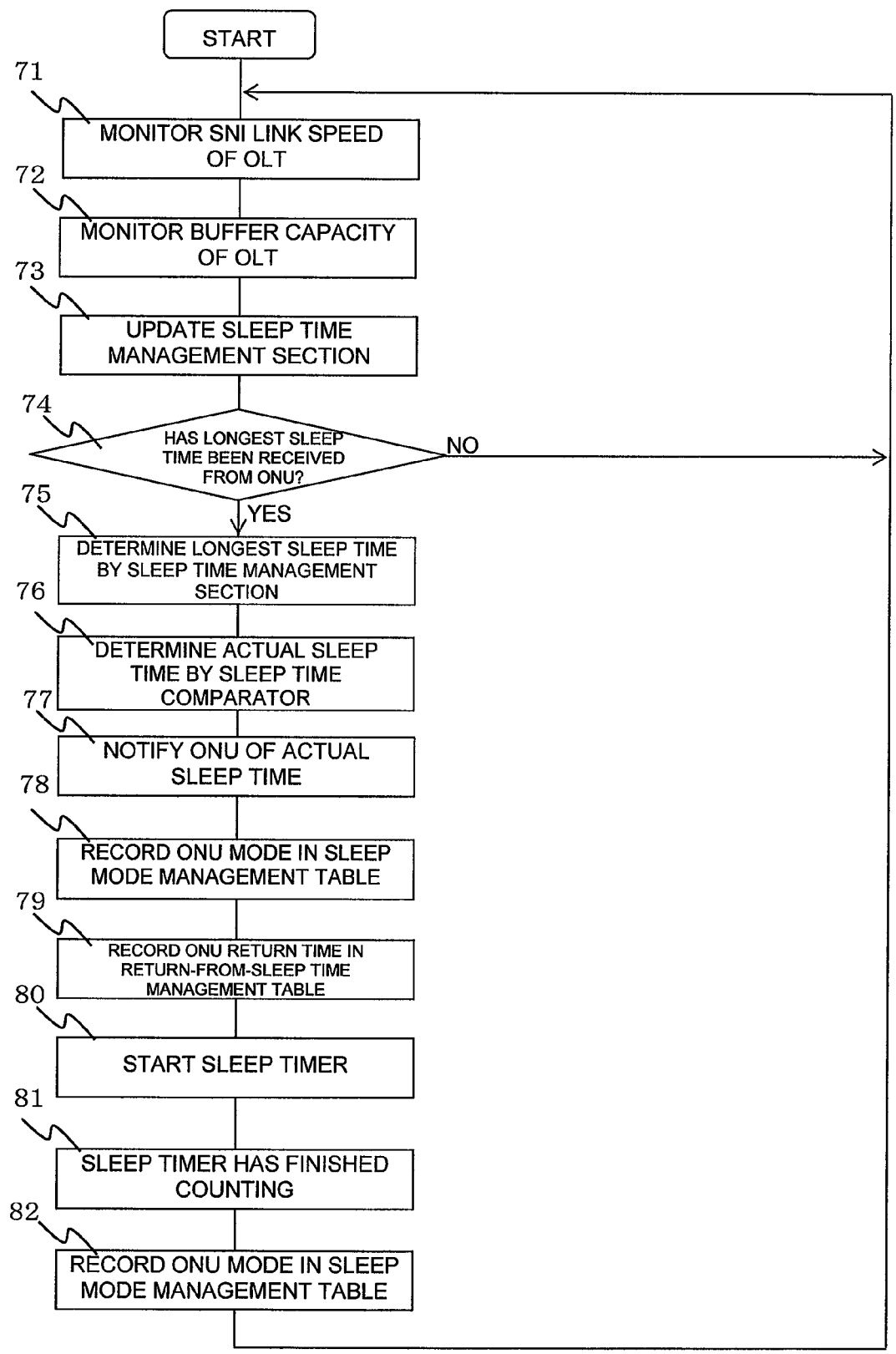
FIG. 10 is a flowchart of OLT operation performed when the ONU makes transition to and return from the sleep mode at ONU trigger 1.

FIG. 10 is an outlined flowchart of OLT operation performed when the ONU makes transition to and return from the sleep mode in the above-described processing case 1.

After the processing of the present embodiment starts, the OLT regularly monitors its link speed and the capacity of its queue buffer by the OLT link speed management section 213 and the OLT buffer capacity management section 214 (Processes 71 and 72). By monitoring these values, the OLT updates the sleep time management section 212, which will be described later (process 73).

When the electro-optical converter 202 receives the longest sleep time notification signal 11 from the ONU A (process 74), the electro-optical converter 202 makes the sleep control signal processor 207 analyze the longest sleep time notification signal 11. The longest sleep time 2 is determined based on information sent from the OLT link speed management section 213 and the OLT buffer capacity management section 214, as described above (process 75). The sleep time comparator compares the longest sleep time 1 obtained from the longest sleep time notification signal 11, with the longest sleep time 2 and determines the actual sleep time (process 76).

The controller 204 makes the sleep control signal processor 207 generate the sleep notification signal 12 and makes the electro-optical converter 202 send the sleep notification signal 12 (process 77). It is recorded in the sleep mode management table 208 that the ONU A is in the sleep mode (process 78). The time when the ONU A will return from the sleep mode is recorded in the return-from-sleep time management table 209 (process 79).

Then, while the ONU A is in the sleep mode, downstream frames are stored in the queue buffer A 205. The return-from-sleep time management table 209 monitors the value of the time counter 210 until the time counter 210 reaches the return-from-sleep time described above (processes 80 and 81). When the value of the time counter 210 reaches the return-from-sleep time, it is recorded in the sleep mode management table 208 that the ONU A is in the normal operation mode (process 82). After communications with the ONU A are established, a request for transition to the sleep mode is made in the same procedure as that described above.

Processing Case 2 for Transition to and Return from Sleep Mode

Figure 11:
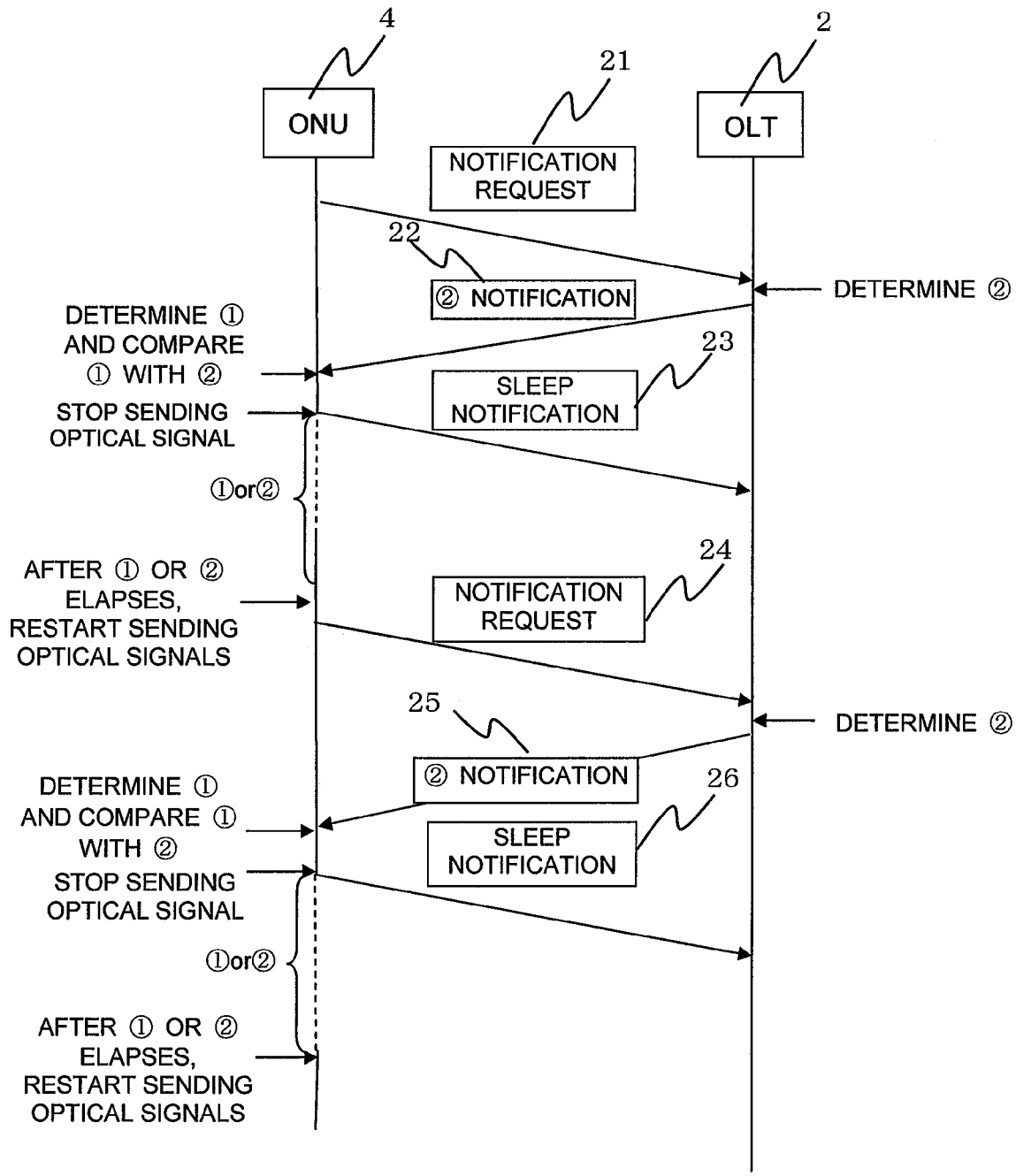
FIG. 11 is a sequence diagram showing how the ONU makes transition to and return from the sleep mode at ONU trigger 2.

FIG. 11 is a sequence diagram indicating that the ONU makes transition to and return from the sleep mode at ONU trigger 2.

When the ONU is in the normal operation mode, the sleep control signal processor 406 monitors the passing information of upstream and downstream frames, sent from the controller 404, and measures the time during which a frame does not pass by regularly referring to the time counter 409 or every time an upstream or downstream frame passes. When a non-communication state in which an upstream or downstream frame does not pass has lasted for a predetermined time, the sleep mode controller 407 makes the sleep control signal processor 406 generate a longest sleep time notification request signal 21 through the controller 404. The longest sleep time notification request signal 21 includes information indicating the ONU identification information. The sleep mode controller 407 makes the electro-optical converter 402 send the longest sleep time notification request signal 21. When the OLT controller 204 receives the longest sleep time notification request signal 21 from the electro-optical converter 402, the OLT controller 204 makes the sleep control signal processor 207 analyze the longest sleep time notification request signal 21. The controller 204 identifies the ONU A, which is the transmission source of the longest sleep time notification request signal 21, the controller 204 makes the sleep control signal processor 207 generate a longest sleep time notification signal 22. The longest sleep time notification signal 22 includes information indicating the longest sleep time 2 obtained from information managed by the OLT link speed management section 213 and the OLT buffer capacity management section 214.

When the controller 404 receives the longest sleep time notification signal 22 from the electro-optical converter 202, the controller 404 makes the sleep control signal processor 406 analyze the longest sleep time notification signal 22. The controller 404 makes the sleep time comparator 410 compare the longest sleep time 1 obtained from information managed by the ONU link speed management section 412 and the ONU buffer capacity management section 413, with the longest sleep time 2 obtained from the longest sleep time notification signal 22. The controller 404 determines the actual sleep time by comparison, and then, makes the sleep control signal processor 406 generate a sleep notification signal 23. The controller 404 also refers to the value of the time counter 409 obtained when the sleep notification signal 23 is generated, to calculate the value of the time counter obtained at the return-from-sleep time, and records the value in the sleep mode controller 407. The controller 404 further calculates the value of the time counter 209 of the OLT obtained at the return-from-sleep time and records the value in the return-from-sleep time management table 408. The sleep notification signal 23 includes, for example, the ONU identification information and the value of the time counter 209 obtained at the return-from-sleep time. The controller 404 makes the electro-optical converter 402 send the sleep notification signal 23 and, at the same time, stops supplying power to the electro-optical converter 402. Then, the controller 404 changes the mode to a mode in which an upstream frame received from the electrical-signal transmission and receiving section 401 is transferred to the queue buffer 405; and continues only that transfer function and a function necessary for a procedure for returning from the sleep mode and stops the other functions.

When the OLT controller 204 receives the sleep notification signal 23 from the electro-optical converter 402, the OLT controller 204 makes the sleep control signal processor 207 analyze the sleep notification signal 23. The controller 204 identifies the ONU A, which is the transmission source of the sleep notification signal 23, and the controller 204 records in the sleep mode management table 208 that the ONU A is in the sleep mode. The controller 204 also records the value of the time counter obtained at the return-from-sleep time in the return-from-sleep time management table. While the ONU A is in the sleep mode, upstream frames are stored in the queue buffer 405 and downstream frames are stored in the queue buffer A 205. The sleep mode controller 407 monitors the value of the time counter 409 until the time counter 409 reaches the return-from-sleep time described above.

When the time counter 409 reaches the return-from-sleep time, the sleep mode controller 407 changes the controller 404 to the normal operation mode. In the normal operation mode, the controller 404 restarts supplying power to the electro-optical converter 402, establishing communications with the electro-optical converter 202 of the OLT. When communications are established between the electro-optical converter 202 of the OLT and the electro-optical converter 402 of the ONU, the ONU controller 404 refers to the queue buffer 405 to check whether an upstream frame received during the sleep mode exists. When a state in which an upstream frame does not exist continues, the controller 404 generates a longest sleep time notification request signal 24 at a predetermined occasion and sends it to the OLT electro-optical converter 202, in the same procedure as that described above. When the controller 204 receives the longest sleep time notification request signal 24 from the electro-optical converter 202, the controller 204 sends a longest sleep time notification signal 25 that includes the longest sleep time 2 to the ONU A, in the same procedure as that described above. When the ONU A receives the longest sleep time notification signal, the ONU A sends a sleep notification signal 26 to the OLT and, at the same time, changes its mode to the sleep mode. As long as an upstream frame to be sent to the electrical-signal transmission and receiving section 401 of the ONU A does not exist and a downstream frame to be sent to the electrical-signal transmission and receiving section 201 of the OLT does not exist, the above procedures are repeated and the ONU A is intermittently in the sleep mode.

Processing Case 3 for Transition to and Return from Sleep Mode

Figure 12:
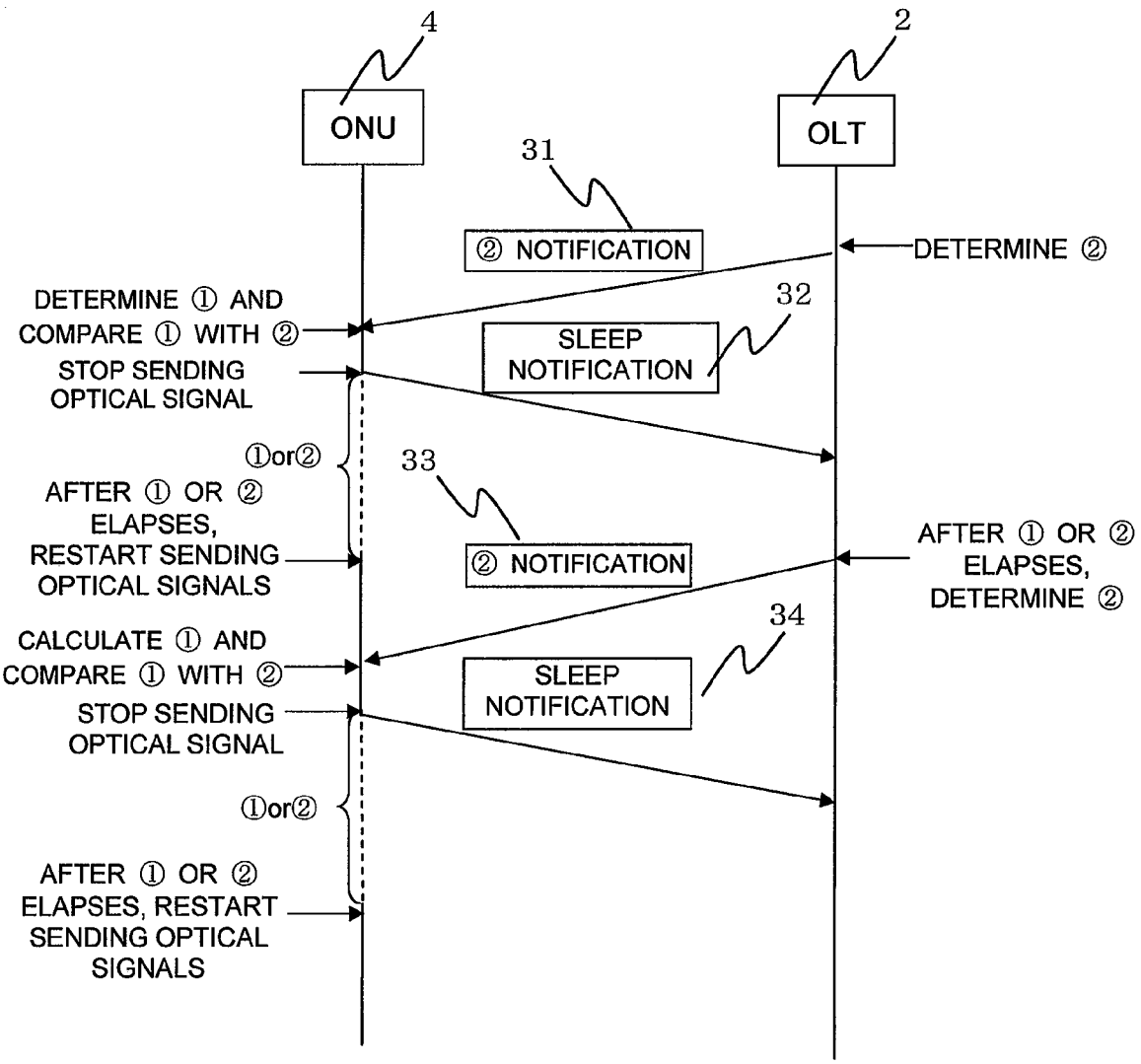
FIG. 12 is a sequence diagram showing how the ONU makes transition to and return from the sleep mode at OLT trigger 1.

FIG. 12 is a sequence diagram indicating that the ONU makes transition to and return from the sleep mode at OLT trigger 1.

When the OLT is in the normal operation mode, the sleep control signal processor 207 monitors the passing information of upstream and downstream frames, sent from the controller 204, and measures the time during which a frame does not pass by regularly referring to the time counter 210 or every time an upstream or downstream frame passes. When a non-communication state in which an upstream or downstream frame does not pass has lasted for a predetermined time, the sleep mode management table 208 makes the sleep control signal processor 207 generate a longest sleep time notification signal 31 through the controller 204. The longest sleep time notification signal 31 includes information indicating the longest sleep time 2 obtained from information managed by the OLT link speed management section 213 and the OLT buffer capacity management section 214. When the controller 404 receives the longest sleep time notification signal 31 from the electro-optical converter 202, the controller 404 makes the sleep control signal processor 406 analyze the longest sleep time notification signal 31. The controller 404 makes the sleep time comparator 410 compare the longest sleep time 1 obtained from information managed by the ONU link speed management section 412 and the ONU buffer capacity management section 413, with the longest sleep time 2 obtained from the longest sleep time notification signal 31. The controller 204 determines the actual sleep time by comparison, and then, makes the sleep control signal processor 406 generate a sleep notification signal 32. The controller 404 also refers to the value of the time counter 409 obtained when the sleep notification signal 32 is generated, to calculate the value of the time counter obtained at the return-from-sleep time, and records the value in the sleep mode controller 407. The controller 404 further calculates the value of the time counter 209 of the OLT obtained at the return-from-sleep time and records the value in the return-from-sleep time management table 408. The sleep notification signal 32 includes the ONU identification information and the value of the time counter 209 obtained at the return-from-sleep time. The controller 404 makes the electro-optical converter 402 send the sleep notification signal 32 and, at the same time, stops supplying power to the electro-optical converter 402. Then, the controller 404 changes the mode to a mode in which an upstream frame received from the electrical-signal transmission and receiving section 401 is transferred to the queue buffer 405; and continues only that transfer function and a function necessary for a procedure for returning from the sleep mode and stops the other functions.

When the OLT controller 204 receives the sleep notification signal 32 from the electro-optical converter 402, the OLT controller 204 makes the sleep control signal processor 207 analyze the sleep notification signal 32. The controller 204 identifies the ONU A, which is the transmission source of the sleep notification signal 32, and the controller 204 records in the sleep mode management table 208 that the ONU A is in the sleep mode. The controller 204 also records the value of the time counter obtained at the return-from-sleep time in the return-from-sleep time management table. While the ONU A is in the sleep mode, upstream frames are stored in the queue buffer 405 and downstream frames are stored in the queue buffer A 205. The sleep mode controller 407 monitors the value of the time counter 409 until the time counter 409 reaches the return-from-sleep time described above. When the time counter 409 reaches the return-from-sleep time, the sleep mode controller 407 changes the controller 404 to the normal operation mode. In the normal operation mode, the controller 404 restarts supplying power to the electro-optical converter 402, establishing communications with the electro-optical converter 202 of the OLT. When communications are established between the electro-optical converter 202 of the OLT and the electro-optical converter 402 of the ONU, the OLT controller 204 refers to the queue buffer 205 to check whether a downstream frame received during the sleep mode exists. When a state in which a downstream frame does not exist continues, the controller 204 generates a longest sleep time notification signal 33 at a predetermined occasion and sends it to the electro-optical converter 402 of the ONU A, in the same procedure as that described above. When the controller 404 receives the longest sleep time notification signal 33 from the electro-optical converter 402, the controller 404 sends a sleep notification signal 34 to the OLT and, at the same time, changes its mode to the sleep mode. As long as an upstream frame to be sent to the electrical-signal transmission and receiving section 401 of the ONU A does not exist and a downstream frame to be sent to the electrical-signal transmission and receiving section 201 of the OLT does not exist, the above procedures are repeated and the ONU A is intermittently in the sleep mode.

Processing Case 4 for Transition to and Return from Sleep Mode

Figure 13:
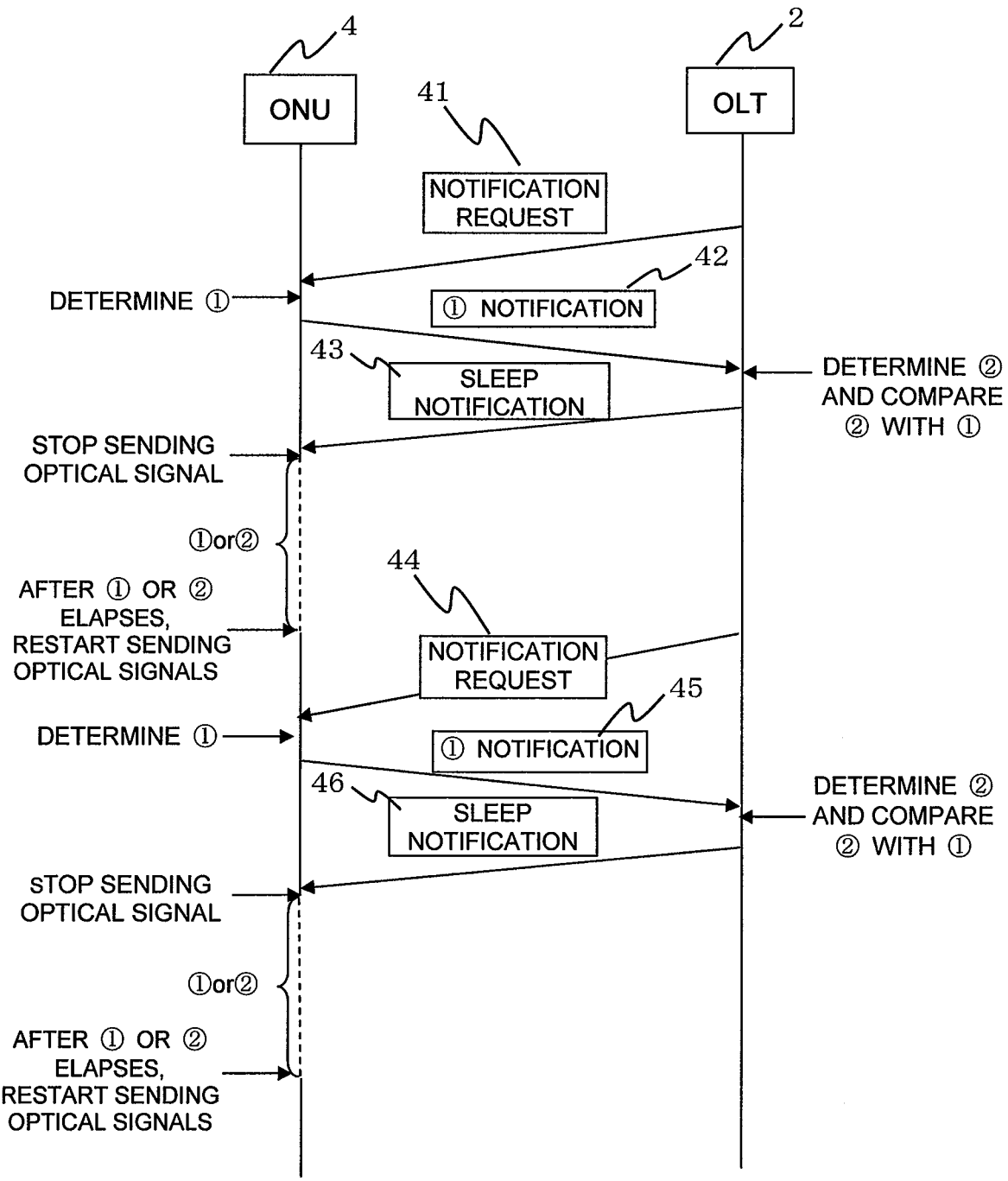
FIG. 13 is a sequence diagram showing how the ONU makes transition to and return from the sleep mode at OLT trigger 2.

FIG. 13 is a sequence diagram indicating that the ONU makes transition to and return from the sleep mode at OLT trigger 2.

When the OLT is in the normal operation mode, the sleep control signal processor 207 monitors the passing information of upstream and downstream frames, sent from the controller 204, and measures the time during which a frame does not pass by regularly referring to the time counter 210 or every time an upstream or downstream frame passes. When a non-communication state in which an upstream or downstream frame does not pass has lasted for a predetermined time, the sleep mode management table 208 makes the sleep control signal processor 207 generate a longest sleep time notification request signal 41 through the controller 204.

When the controller 404 receives the longest sleep time notification request signal 41 from the electro-optical converter 202, the controller 404 makes the sleep control signal processor 406 analyze the longest sleep time notification request signal 41. The controller 404 makes the sleep control signal processor 406 generate a longest sleep time notification signal 42. The longest sleep time notification signal 42 includes the ONU identification information and information indicating the longest sleep time 1 obtained from information managed by the ONU link speed management section 412 and the OLT buffer capacity management section 413.

When the OLT controller 204 receives the longest sleep time notification signal 42 from the electro-optical converter 402, the controller 204 makes the sleep control signal processor 207 analyze the longest sleep time notification signal 42. The controller 204 identifies the ONU A, which is the transmission source of the longest sleep time notification signal 42, and makes the sleep time comparator 211 compare the longest sleep time 2 obtained from information managed by the OLT link speed management section 213 and the OLT buffer capacity management section 214, with the longest sleep time 1 obtained from the longest sleep time notification signal 42. The controller 204 determines the actual sleep time by comparison, and then, makes the sleep control signal processor 207 generate a sleep notification signal 43. At the same time, the controller 204 records in the sleep mode management table 208 that the ONU A is in the sleep mode. The controller 204 also refers to the value of the time counter 210 obtained when the sleep notification signal 43 is generated, to calculate the value of the time counter obtained at the return-from-sleep time, and records the value in the return-from-sleep time management table 209. The controller 204 further calculates the value of the time counter 409 of the ONU A obtained at the return-from-sleep time and records the value in the return-from-sleep time management table 209. The sleep notification signal 43 includes the ONU identification information of the ONU A, which is going to make transition to the sleep mode, and the value of the time counter obtained at the return-from-sleep time.

When the controller 404 receives the sleep notification signal 43 from the electro-optical converter 202, the controller 404 makes the sleep control signal processor 406 analyze the sleep notification signal 43. When the controller 404 identifies the permission of the OLT controller 204 for the transition of the ONU A to the sleep mode, the controller 404 records the return-from-sleep time in the sleep mode controller 407. Then, the controller 404 changes the mode to a mode in which an upstream frame received from the electrical-signal transmission and receiving section 401 is transferred to the queue buffer 405; and continues only that transfer function and a function necessary for a procedure for returning from the sleep mode and stops the other functions. While the ONU A is in the sleep mode, upstream frames are stored in the queue buffer 405 and downstream frames are stored in the queue buffer A 205. The sleep mode controller 407 monitors the value of the time counter 409 until the time counter 409 reaches the return-from-sleep time described above.

When the time counter 409 reaches the return-from-sleep time, the sleep mode controller 407 changes the controller 404 to the normal operation mode. In the normal operation mode, the controller 404 restarts supplying power to the electro-optical converter 402, establishing communications with the electro-optical converter 202 of the OLT. When communications are established between the electro-optical converter 202 of the OLT and the electro-optical converter 402 of the ONU, the OLT controller 204 refers to the queue buffer 205 to check whether a downstream frame received during the sleep mode exists. When a state in which a downstream frame does not exist continues, the controller 204 generates a longest sleep time notification request signal 44 and sends it to the electro-optical converter 402 of the ONU A, in the same procedure as that described above. When the controller 404 receives the longest sleep time notification request signal 44 from the electro-optical converter 402, the controller 404 sends a longest sleep time notification signal 45 that includes the longest sleep time 1 to the OLT, in the same procedure as that described above. When the OLT receives the longest sleep time notification signal, the OLT sends a sleep notification signal 46 to the ONU A and, at the same time, changes its mode to the sleep mode. As long as an upstream frame to be sent to the electrical-signal transmission and receiving section 401 of the ONU A does not exist and a downstream frame to be sent to the electrical-signal transmission and receiving section 201 of the OLT does not exist, the above procedures are repeated and the ONU A is intermittently in the sleep mode.

According to the present embodiment, in a PON system formed of at least one OLT and ONUs, the longest possible sleep modes are selected by the OLT and ONUs based on their link speeds and the queue buffer capacities, and the sleep modes are compared and one of them is selected. Therefore, the power consumption of the ONUs can be reduced in a non-communication period while data missing is prevented.

Example Structure

A passive optical network (PON) system according to the embodiment includes, for example, at least one optical line terminal (OLT) and a plurality of optical network units. The OLT includes an electro-optical converter and a media access controller for communications with the ONUs; a plurality of queue buffers for holding downstream data, managed for each destination ONU; a controller for sleep control; and an interface for communications with an upper network. The controller for sleep control provided for the OLT includes a buffer capacity management section for managing the capacity of each of the queue buffers in the OLT; and a link speed management section for managing the link speed at which the interface for communications with the upper network communicates with the upper network. Each of the ONUs includes an electro-optical converter and a media access controller for communications with the OLT; a queue buffer for holding upstream data; a controller for sleep control; and an interface for communications with a communication terminal. The controller for sleep control provided for the ONU includes a buffer capacity management section for managing the capacity of the queue buffer in the ONU; and a link speed management section for managing the link speed at which the interface for communications with the communication terminal communicates with the communication terminal.

The present invention can be used, for example, for passive optical network systems.

What is claimed is:

1. A passive optical network system comprising at least one optical line terminal and a plurality of optical network units, the optical line terminal comprising:
   a first interface for communications with an upper network at a first link speed;
   a first queue buffer for holding downstream data for each of the destination optical network units;
   an electro-optical converter for communications with the optical network units; and
   a first controller for applying sleep control to the optical network units;
each of the optical network units comprising:
   a second interface for communications with a communication terminal at a second link speed;
   a second queue buffer for holding upstream data bound for the optical line terminal;

an electro-optical converter for communications with the optical line terminal; and a second controller for applying sleep control to the local optical network unit;

wherein:

the first controller of the optical line terminal calculating a first sleep time candidate based on a capacity of an unused area of the first queue buffer and the first link speed;

the second controller of each of the optical network units calculating a second sleep time candidate based on a capacity of an unused area of the second queue buffer and the second link speed;

either the first controller or the second controller comparing the first sleep time candidate and the second sleep time candidate for at least one of the optical network units and determining the smaller thereof as an actual sleep time; and the at least one of the optical network units being changed to a sleep mode during the determined actual sleep time.

2. A passive optical network system according to claim 1, wherein the first sleep time candidate and the second sleep time candidate are set longer as the capacities of the unused areas of the first queue buffer and the second queue buffer increase and are set shorter as the first link speed and the second link speed increase.

3. A passive optical network system according to claim 1, wherein the first controller of the optical line terminal determines the first sleep time candidate corresponding to a time at which the first queue buffer becomes full, when downstream data bound for the optical network units is received at the first link speed and is stored in the first queue buffer, based on the capacity of the unused area of the first queue buffer and the first link speed; and/or the second controller of each of the optical network units determines the second sleep time candidate on the basis of a time at which the second queue buffer becomes full, when upstream data is received at the second link speed and is stored in the second queue buffer, based on the capacity of the unused area of the second queue buffer and the second link speed.

4. A passive optical network system according to claim 1, wherein the first controller of the optical line terminal comprises a first sleep time candidate memory area having stored a predetermined first sleep time candidate corresponding to the capacity of the unused area of the first queue buffer and the first link speed, and determines the first sleep time candidate by referring to the first sleep time candidate memory area; and the second controller of each of the optical network units comprises a second sleep time candidate memory area having stored a predetermined second sleep time candidate corresponding to the capacity of the unused area of the second queue buffer and the second link speed, and determines the second sleep time candidate by referring to the second sleep time candidate memory area.

5. A passive optical network system according to claim 1, wherein the first controller of the optical line terminal comprises:

a first buffer capacity management section for managing the capacity of the unused area of the first buffer; and a first link speed management section for managing the first link speed, which is determined in advance, at which the first interface communicates with the upper network; and/or the second controller of each of the optical network units comprises:

a second buffer capacity management section for managing the capacity of the unused area of the second buffer; and a second link speed management section for managing the second link speed, which is determined in advance, at which the second interface communicates with the communication terminal.

6. A passive optical network system according to claim 1, wherein the optical line terminal notifies the optical network units of the obtained first sleep time candidate at a predetermined occasion, and the second controller of each of the optical network units determines the actual sleep time; or each of the optical network units notifies the optical line terminal of the obtained second sleep time candidate at a predetermined occasion, and the first controller of the optical line terminal determines the actual sleep time.

7. A passive optical network system according to claim 1, wherein, at a predetermined occasion, each of the optical network units requests the optical line terminal to notify of the first sleep time candidate, and the second controller of each of the optical network units determines the actual sleep time; or at a predetermined occasion, the optical line terminal requests each of the optical network units to notify of the second sleep time candidate, and the first controller of the optical line terminal determines the actual sleep time.

8. A passive optical network system according to claim 1, wherein the first controller of the optical line terminal compares the first sleep time candidate received from each of the optical network units with the second sleep time candidate to determine the actual sleep time, and notifies each of the optical network units of the actual sleep time; or the second controller of each of the optical network units compares the second sleep time candidate received from the optical line terminal with the first sleep time candidate to determine the actual sleep time, and notifies the optical line terminal of the actual sleep time.

9. A passive optical network system according to claim 8, wherein the optical line terminal and each of the optical network units further comprise a timer for counting the actual sleep time in the sleep mode; and the optical line terminal and each of the optical network units set the actual sleep time in the timers, and returning to a normal operation mode is performed when the timer finishes counting the set sleep time.

10. A passive optical network system according to claim 1, wherein the optical line terminal further comprises a sleep mode management section for storing identification information of the at least one of the optical network units, which is in the sleep mode; and when downstream data bound for any of the optical network units is received, the optical line terminal refers to the sleep mode management section to determine whether the destination optical network unit is in the sleep mode, and, if the destination optical network unit is in the sleep mode, stores the downstream data bound for the destination optical network unit in the first queue buffer.

11. A passive optical network system according to claim 1, wherein, when receiving upstream data from the communication terminal, the second queue buffer of each of the optical network units stores the upstream data even in the sleep mode.

12. A sleep time determination method of determining a sleep time of each optical network unit in a passive optical network system provided with at least one optical line terminal and a plurality of optical network units, comprising the steps of:

calculating a first sleep time candidate based on a first link speed at which the optical line terminal communicates with an upper network and a capacity of an unused area of a first queue buffer where downstream data is held for each of the destination optical network units, by the optical line terminal;

calculating a second sleep time candidate based on a second link speed at which each of the optical network units communicates with a communication terminal and a capacity of an unused area of a second queue buffer where upstream data bound for the optical line terminal is held, by each of the optical network units; and comparing the first sleep time candidate and the second sleep time candidate for at least one of the optical network units and determining the smaller thereof as an actual sleep time used to change the at least one of the optical network units to a sleep mode, by either the optical line terminal or the at least one of optical network units.

13. A sleep time determination method according to claim 12,
wherein the first sleep time candidate and the second sleep time candidate are set longer as the capacities of the unused areas of the first queue buffer and the second queue buffer increase and are set shorter as the first link speed and the second link speed increase.

14. A sleep time determination method according to claim 12,
wherein the optical line terminal determines the first sleep time candidate corresponding to a time at which the first queue buffer becomes full, when downstream data bound for the optical network units is received at the first link speed and is stored in the first queue buffer, based on the capacity of the unused area of the first queue buffer and the first link speed; and/or
each of the optical network units determines the second sleep time candidate on the basis of a time at which the second queue buffer becomes full, when upstream data is received at the second link speed and is stored in the second queue buffer, based on the capacity of the unused area of the second queue buffer and the second link speed.

15. A sleep time determination method according to claim 12,
wherein the optical line terminal notifies the optical network units of the obtained first sleep time candidate at a predetermined occasion, and each of the optical network units determines the actual sleep time; or
each of the optical network units notifies the optical line terminal of the obtained second sleep time candidate at a predetermined occasion, and of the optical line terminal determines the actual sleep time.

16. A sleep time determination method according to claim 12,
wherein, at a predetermined occasion, each of the optical network units requests the optical line terminal to notify of the first sleep time candidate, and each of the optical network units determines the actual sleep time; or
at a predetermined occasion, the optical line terminal requests each of the optical network units to notify of the second sleep time candidate, and the optical line terminal determines the actual sleep time.

17. A sleep time determination method according to claim 12,
wherein the optical line terminal compares the first sleep time candidate received from each of the optical network units with the second sleep time candidate to determine the actual sleep time, and notifies each of the optical network units of the actual sleep time; or
each of the optical network units compares the second sleep time candidate received from the optical line terminal with the first sleep time candidate to determine the actual sleep time, and notifies the optical line terminal of the actual sleep time.

18. A sleep time determination method according to claim 12,
wherein, when receiving upstream data from the communication terminal, the second queue buffer of each of the optical network units stores the upstream data even in the sleep mode.

* * * * *